US006630042B2

(12) United States Patent
Smith et al.

(10) Patent No.: US 6,630,042 B2
(45) Date of Patent: *Oct. 7, 2003

(54) TACKIFYING TREATMENT FOR FLOOR MATS

(75) Inventors: Kim R. Smith, Woodbury, MN (US); David J. Falbaum, Minneapolis, MN (US); Paul J. Mattia, Prior Lake, MN (US)

(73) Assignee: Ecolab Inc., St. Paul, MN (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/175,836

(22) Filed: Oct. 19, 1998

(65) Prior Publication Data

US 2002/0129895 A1 Sep. 19, 2002

(51) Int. Cl.$^7$ .................................................. E04B 2/00
(52) U.S. Cl. ..................... 156/71; 106/36; 156/306.3; 156/315; 238/14; 523/150; 524/563; 526/319
(58) Field of Search .......................... 106/36; 524/563; 526/319; 156/306.3, 315, 71; 238/14; 523/150

(56) References Cited

U.S. PATENT DOCUMENTS

| | | | | |
|---|---|---|---|---|
| 2,465,295 A | * | 3/1949 | Strauss | ........................ 524/563 |
| 3,104,195 A | | 9/1963 | Warnberg | |
| 3,586,598 A | * | 6/1971 | Beemer | ........................ 156/71 |
| 3,598,677 A | * | 8/1971 | Bergmeister et al. | ......... 106/36 |
| 3,625,807 A | | 12/1971 | Beemer | |
| 3,804,699 A | | 4/1974 | Johnson | |
| 4,336,293 A | | 6/1982 | Eiden | |
| 4,397,906 A | | 8/1983 | Nakagawa et al. | |
| 4,654,388 A | | 3/1987 | Lofgren | |
| 4,721,641 A | | 1/1988 | Bailey | |
| 4,810,573 A | | 3/1989 | Harriet | |
| 5,547,741 A | | 8/1996 | Wilson | |
| 5,565,511 A | | 10/1996 | Braud et al. | |

FOREIGN PATENT DOCUMENTS

| | | | |
|---|---|---|---|
| DE | 1 810 275 | 6/1970 | |
| GB | 668721 | 3/1952 | |
| JP | 53-57233 | * 5/1978 | ................. 156/315 |
| WO | WO 95/03723 | 2/1995 | |

* cited by examiner

*Primary Examiner*—Geoffrey L. Knable
(74) *Attorney, Agent, or Firm*—Merchant & Gould P.C.

(57) ABSTRACT

The present invention includes a method of reducing slippage between a mat having a flexible polymer back surface and a substrate surface contiguous to the back surface, the method comprising applying a liquid comprising an aqueous solution of poly(vinyl acetate) to the back surface and contacting the back surface with the liquid thereon to the substrate surface while the aqueous solution is still wet. The method is especially effective where the mat comprises a flexible polymeric back surface comprising a flexible polymer selected from the group consisting of natural rubber, synthetic rubber, natural elastomers and synthetic elastomers. The contacting may be performed before the aqueous solution is completely dried. The aqueous solution may be applied directly to the back surface by spraying said aqueous solution onto said surface. The aqueous solution may be applied directly to the substrate surface. The aqueous solution may, for example, comprise from 1 to 90% by weight of the solution of poly(vinyl acetate) or 1 to 99% by weight of the solution as poly(vinyl acetate).

16 Claims, No Drawings

TACKIFYING TREATMENT FOR FLOOR MATS

BACKGROUND OF THE INVENTION

1. Field of the Invention

The present invention relates to floor mats, particularly to the stabilization of floor mats against slipping and potentially injuring people.

2. Background of the Art

Floor mats are used in a wide variety of locations in many public and private locations. Floor mats are considered to be any surface covering with a rubber, flexible polymer or elastomeric backing or back surface which is placed on the floor. The surface material may be the same as the backing surface (e.g., where a solid cast, molded, extruded or cast mat system such as a Nomad™ mat [manufactured by Minnesota Mining and Manufacturing Co.] is used), or the top surface of the mat may be composed of a substantially different composition or be present in a substantially different form. For example, many floor mats are available with a fabric or fabric appearing surface layer with the rubber, flexible polymer or elastomeric backing or back (hereinafter generally and collectively referred to as a rubber backing) adhered to the bottom or floor contacting side of the mat. The floor mats may be used in entrance ways (e.g., door mats), in transitional areas (e.g., between different rooms or offices), or may be used as decoration or surface protection generally. Many mats are also provided as a safety measure to prevent slippage in areas that may be polished, areas that may become wet and slippery, areas that tend to be slippery because of surfaces which have been worn smooth, and/or to provide antistatic protection. These mats may also referred to as tiles, small area carpets, foot mats and the like in some fields of use.

The rubber, flexible polymer or elastomeric backing or back surface may be comprised of such elastic or elastomeric materials such as those selected from the group consisting of natural rubbers and polymers, blended compositions with natural rubber, synthetic rubbers and polymers (e.g., polyisoprene), and synthetic elastomeric compositions (e.g., polyurethane elastomers, polysiloxane elastomers, and other elastomeric polymeric materials). When a new mat with a rubber backing is first used, it generally tends to display good initial resistance to slippage. When the mat is placed on most surfaces (e.g., concrete, cement, linoleum, vinyl flooring, wood floors, terrazzo, stone, and the like) it resists slipping, even when modest force is applied against the mat with a non-perpendicular (with respect to the floor) component, even when a forty-five degree (50/50 force distribution parallel and perpendicular to the floor) is applied. Unfortunately, rubber backings tend to be subject to various types of deleterious changes with time. They may lose plasticizer, the rubber composition may break down from physical wear (both from flexing and from compression), and chemical changes may occur in the rubber backing because of heat, radiation (especially ultraviolet radiation), and contact with aerial oxygen or cleaners or spilled materials. This change in the properties of the rubber backing often is exhibited as a hardening, cracking, and/or discoloring of the rubber backing, but more importantly, these changes can affect the coefficient of friction between the rubber mat and a floor surface, reducing the ability of the rubber backing to reduce slippage of the mat.

It has been disclosed in the literature to apply adhesives to the rubber back side of the mat when it is first applied and as the mat continues to be used after displaying wear. Typical adhesives used to secure the mats or tiles to a floor include elastomers with tackifying components (e.g., natural gums and resins) as shown in U.S. Pat. No. 3,625,807.

U.S. Pat. No. 3,804,699 describes a mat especially useful for protecting carpeted surfaces which is secured with a bonding resin comprising plastisols based on poly(vinyl chloride) resins, in an amount of from at least 2 pounds per square yard of mat.

U.S. Pat. No. 4,336,293 describes an antislip floor mat used on a floor surface which is useful in food service and industrial areas. The backing layer appears to be an extruded and laminated layer of poly(vinyl chloride), and the surface is a non-slip, abrasive-filled polymeric composition.

U.S. Pat. No. 4,721,641 describes a readily removable antislip floor mat with a thermoformed backing layer comprising high density polyethylene, and an ethylene-vinyl acetate copolymer.

U.S. Pat. No. 4,654,388 describes an adhesive composition for use with flooring comprising an aqueous dispersion of a film forming resin, finely divided filler, diethylene glycol monobutyl ether, and a tackifying agent (such as wood resin and esterified resin). A film-forming vinyl resin is preferred, such as acrylic copolymers and an ethylene-vinyl acetate copolymer. Specific ratios of ingredients are also preferred.

U.S. Pat. No. 3,104,195 describes a rug adapted to be rested on a floor, the rug comprising at least three component layers. A pad is positioned between upper and lower panels, the pad having a coefficient of friction with the floor greater than the coefficient of friction of the panel. This provides for antislip, but slidable contact with the floor.

Japanese Patent No. JP 5 228067 A describes an antislip bath mat with high friction to the bath floor which eliminates slippage when wet. The composition of the mat is 20–60 parts ethylene-vinyl acetate copolymer having a vinyl acetate content of at least 10% and 40–80 parts by weight of olefin polymer.

Japanese Patent No. JP 08 112880 A2 (JP 94-278399, 94/1017) describes pads useful as carpets or floor mats in which a series of dots comprising ethylene-vinyl acetate copolymer are applied onto the back of a fiber based pad and the copolymer is hot-pressed.

Japanese Patent No. 08 053657, JP 94-209268 describes an adhesive composition used for wood floor material comprising acrylic polymer emulsion, elastomer, and particulates.

Many patents describe particular adhesive compositions which are used to secure flooring materials, whether panels, tiles, mats or the like. Some of these patents include U.S. Pat. No. 5,565,511 describing a stabilized latex (e.g., styrene-butadiene rubber latex) and a caustic agent used to provide good adhesive strength, good aging, and fast drying; U.S. Pat. No. 5,547,741 describes flexible wear layers of poly(vinyl chloride, monomeric ester plasticizer, and urethane polymer; and U.S. Pat. No. 4,810,573 describes a flowable bentonite composition on the back of elastomeric mats which composition can flow into holes and cracks. Some of the Japanese Patents which describe adhesive compositions for use with mats and tiles include, for example, JP 7040777 A describes a mat having a thermoplastic elastomer adhesive having a range of hardness comprising 10–40% styrene and a thermoplastic component free of halogen and sulfur; JP 6057931 A describes the use of vinyl chloride based amorphous particles preferably comprising a vinyl chloride, vinyl chloride/vinyl acetate copolymer, and an UV/heat hardening agent for hardening after application.

Japanese Patent No. JP 4341844 A describes an antislipping sheet for bandages and floor mats produced by applying a foamable liquid coating onto the surface of a substrate paper, heat treating the coated sheet to obtain a foamed sheet, applying an adhesive onto the surface of a substrate to obtain an adhesive sheet, bonding the foamed sheet and the adhesive layer of the adhesive sheet to obtain a layered sheet, and stripping the substrate paper from the layered sheet. The coating liquid (the foamable liquid coating) contains an adhesive component (e.g., esterified starch, poly(vinyl alcohol), polyacrylic acid, or ethylene-maleic anhydride copolymer. The liquid composition is not disclosed as being applied directly to the back side of a mat.

It is often necessary to clean or replace individual mats or tiles after use. When an adhesive has been placed between the mat and the floor, the adhesive seal must be broken, usually leaving residue on the floor and on the backing of the tile or mat. These residues can build-up with each new application of adhesive, an uneven floor surface can develop, mat edges can be forced out of horizontal alignment by the resides, and uneven adhesive securement can exist because the adhesive may locate between segments of the residue and the new adhesive may not contact both the backing and the floor. The use of solvents to remove the residues can damage the floor surface, damage the tile or mat, and alter the adhesive properties of the new application of adhesive if solvent remains on either of the surfaces. An alternative means and composition for securing mats against slipping is desirable.

SUMMARY OF THE INVENTION

Mats which have a flexible and/or elastomeric or rubbery backing material may be coated with an aqueous solution of poly(vinyl acetate) before application of the mat to a floor surface (i.e., placement onto the floor). The aqueous solution may be applied to the flexible backing or the floor and the mat contacted with the floor before the solution has completely dried. The solution bonds the backing of the mat to the floor, the dried material is not aggressively tacky, and the dried solution residue may be removed from the mat and the floor by a water wash or mild detergent and water wash. The solution is readily applied to the mat backing by brushing, painting, wiping, or preferably by a spray, either in aerosol or other pressure pump format.

DETAILED DESCRIPTION OF THE INVENTION

Mats or tiles according to the present invention include any article having a backing layer of flexible polymeric material which article is to be placed on a flat surface such as a floor or counter top. The term polymeric material, as it applies to the backing layer of the mats or tile (hereinafter collectively referred to as "mats") includes both natural and synthetic polymers and polymeric materials referred to as elastomers. This term would include polymers, copolymers (including those with more than two comonomers, referred to specifically in the art as terpolymers, tetrapolymers, etc.), graft copolymers, block copolymers, blends, solutions and mixtures of polymers (and mixtures with other materials as a composite, as with cork, fiber reinforcement, etc.) and other art recognized equivalents. Typical materials used in forming flexible polymeric backings would include, but not be limited to, natural rubber, synthetic rubber, polyurethane polymers, silicone polymers, polyisoprene, polyacrylates, polyamides, polyolefins, polybutadiene polymers and copolymers, polymers and copolymers of chloroprene rubbers, polymers and copolymers of isobutylene, polyolefin polymers, polystyrene polymers and copolymers, copolymers of butadiene/styrene/acrylonitrile, and the like. The chemical composition of the mat backing is a matter of selection from within the class of flexible polymeric backing materials known within the polymer art, with the description provided being exemplary, but not limiting. The backing may be smooth, ridged, porous, textured or the like and still benefit from the practice of the present invention.

The nature of the surface of the mat away from the poly(vinyl acetate) adhesive is of no criticality to practice of the present invention. The mat surface may comprise the same composition as the backing, either as a distinct layer or as a uniform element (e.g., a single molded article), or may be a completely different material, such as a fabric (printed, dyed or not), a separate polymeric layer (with any manner of decoration desired, such as printed, embossed, laminated, colored, etc.), may have a discontinuous particulate coating (e.g., for decoration or reduced surface slippage), or be provided with or without an edging, etc.

The floor securing composition of the present invention which is applied as a solution/dispersion to the exposed surface of the backing layer of the mat comprises an aqueous solution of poly(vinyl acetate). The floor securing composition may contain at least one percent (1%) by weight solids of poly(vinyl acetate), up to about 90% by weight poly(vinyl acetate). The composition is most readily applied by a spray of the floor securing solution, which would generally use from 1–70% by weight of the solution (including the weight of water) as poly(vinyl acetate). The spray is efficiently applied as from 2–70% by weight, 3–60% by weight, 5–50% by weight poly(vinyl acetate), and the like. More concentrated solutions/dispersion of poly(vinyl acetate) may be applied by brushing, wiping, tray dipping and the like. The coating solution/dispersion may comprise only water and poly(vinyl acetate), or may contain such (convenient additives) which will assist in the drying, application, film forming, stability, appearance or other physical or chemical properties of the aqueous solution. For example, 0.1 to 5% surfactant, coating aids, antistatic agents, cosolvents (e.g., alcohols), UV absorbers, dyes, pigments, fragrances or the like may be present. Some additional binding agent or polymer may be present, but it is desired that the poly(vinyl acetate) be the major (greater than 50% by weight of solids), dominant (e.g., at least 75% by weight), or sole (approximately 100%) polymeric, solid film-forming component in the solution. Agents which tend to harden or crosslink poly(vinyl acetate) may be added, but it is especially desired that the dried solution remain water soluble or water dispersible after they have dried so that the film can be removed easily from floor surfaces and even the back of the mat.

Where a spray application is to be used, especially a hand pump spray or aerosol spray (as opposed to a less desirable but functional mechanically driven spray with greater force and larger vent at the spray head), it is usually desirable to control the particle size, molecular weight of the poly(vinyl acetate) to assure its passage through the spray head with reduced clogging. This consideration is well within the skill of the trade, especially as sprays of poly(vinyl acetate) are commercially available. The polymer particle size should be less than about 90% of the diameter of any nozzle holes in a spray applicator, preferably less than 50% of that spray hole diameter, more preferably less than 10% of the diameter of any nozzle holes in a spray applicator. The particle size is of no significant importance (within obvious physical limits of macrodimensional size limitations) when application is not performed through a nozzle, as where wiping or painting is used.

The present invention includes a method of reducing slippage between a mat having a flexible polymer back surface and a second surface contiguous to the back surface comprising applying a liquid comprising an aqueous solution of poly(vinyl acetate) to said back surface and contacting said back surface with said liquid thereon to said second surface while said aqueous solution is still wet. The method is especially effective where the mat comprises a flexible polymeric back surface comprising a flexible polymer selected from the group consisting of natural rubber, synthetic rubber, natural elastomers and synthetic elastomers. The contacting may be performed before said aqueous solution is completely dried. The aqueous solution may be applied directly to said back surface or directly to said back surface by spraying said aqueous solution onto said back surface. The aqueous solution may applied directly to said second surface, also possibly by spraying. The aqueous solution may, for example, comprise from 1 to 90% by weight of the solution of poly(vinyl acetate) or 1 to 99% by weight of the solution as poly(vinyl acetate).

The method may be practiced where contacting is effected while the aqueous solution, after it has been applied, may still comprise as little as 10% by weight or more (e.g., it will remain tacky at 90% by weight poly(vinyl acetate) in the drying solution) of the solution remaining as water.

The invention also includes a mat having a flexible polymer back surface, said mat being secured in reduced slip orientation to a second surface by a dry layer comprising at least 50% by weight of poly(vinyl acetate). The second surface is usually a floor, but may be a work surface such as a counter top. The dry layer usually comprises at least 90% by weight poly(vinyl acetate), and often at least 99% by weight poly(vinyl acetate). The mat may have an upper surface of the mat which comprises a material which is different from the flexible polymer. The mat may also comprise an antistatic mat which is applied to the floor, with the mat having conductive material (e.g., carbon black, graphite fibers or particles, metallic, conductive polymer, or other conductive material) within a back layer, top layer, a portion of all layers or all layers within the mat. The poly(vinyl acetate) may also contain conductive materials to assure electrical contact or grounding of the mat through the poly(vinyl acetate) adhesive or bonding layer.

In the Examples, a Horizontal Pull Tester was used according to the following practice. A weighted strain gauge is attached to the top of a piece of rubber substrate (acting as the mat), and the rubber mat is pulled by a small motor across a linoleum tiled floor. The effort needed to move the strain gauge from its starting position is measured to provide a relative standard measure of slip resistance (higher numbers representing greater force needed to overcome the adherence and therefore greater slip resistance).

EXAMPLE 1

Dry Control:

The Horizontal Slip Pull Tester was used with a rubber substrate the size of a typical mat. The slip resistance across the tiled floor was measured.

EXAMPLE 2

Wet Control:

The Horizontal Slip Pull Tester was used with a rubber substrate the size of a typical mat after the face of the mat to be placed into contact with the tiled floor has been wet with water. The slip resistance across the tiled floor was measured.

EXAMPLE 3

Polyvinyl Acetate Tackifying Agent:

The Horizontal Slip Pull Tester was used with a rubber substrate the size of a typical mat after the face of the mat to be placed into contact with the tiled floor has been wet with a 15% by weight solution of Vinac™ TL-1 Polyvinyl acetate (Air Products). The solvent carrier medium was water. The rubber substrate was allowed to dry with the Polyvinyl acetate coating in contact with the floor and then the slip resistance across the tiled floor was measured.

EXAMPLE 4

Polyvinyl Acetate Tackifying Agent:

The Horizontal Slip Pull Tester was used with a rubber substrate the size of a typical mat after the face of the mat to be placed into contact with the tiled floor has been wet with a 15% by weight solution of Vinac™ XX-210 Polyvinyl acetate (Air Products). The solvent carrier medium was water. The rubber substrate was allowed to dry with the Polyvinyl acetate coating in contact with the floor and then the slip resistance across the tiled floor was measured.

| RESULTS | |
| --- | --- |
| Example Number | Slip Resistance |
| 1 (Dry Control) | 6 |
| 2 (Wet Control) | 6 |
| 3 (15% Vinac TL-1) | 12 |
| 4 (15% Vinac XX-210) | 12 |

EXAMPLES 5–10

The Polyvinyl acetate antislip coating was directly compared with six other candidate coating materials to evaluate their antislip ability. Six rubber mats were taken, and two distinct areas of coatings were applied at opposite ends of the surface of the mat which was to be placed against the tiled floor surface. The coating on one end was a 15% polyvinyl acetate solution and the other coatings were selected from 5) trienthanolamine, 6) nonylphenol ethoxylate, 7) glycerin, 8) oleic acid, 9) starch, and 10) hydroxyethylcellulose. In every one of these examples, where the mats were placed with the coated faces down while wet and allowed to try, the edge of the mat coated with the Polyvinyl acetate composition remained fixed to the floor noticeably better than each and every one of the other coatings applied to the back surface of the mat. This data provides direct, side-by-side comparison of the Polyvinyl acetate on the same mat against the same floor at the same time and conditions as the other materials were applied.

It is desirable for a number of reasons that the applied solution comprising Polyvinyl acetate be an aqueous or exclusively water-based solution, dispersion or suspension. The reasons for this are cost (water is the least expensive carrier or solvent), water is the most environmentally friendly solvent or carrier, and water is the solvent least likely to do any damage to the surface onto which it is placed (both the mat and the floor).

What is claimed is:

1. A method of reducing slippage between a mat having an elastomeric back surface and a substrate surface comprising:

applying a liquid comprising an aqueous solution of poly(vinyl acetate) directly to the elastomeric back surface; and bringing together the elastomeric back surface and the substrate surface while the aqueous solution is still wet; and allowing the liquid to dry.

2. The method of claim 1 wherein the elastomeric back surface comprises at least one of natural rubber, synthetic rubber, polyurethane polymers, silicone polymers, polyisoprene, polyacrylates, polyamides, polyolefins, polybutadiene polymers and copolymers, polymers and copolymers of chloroprene rubbers, polymers and copolymers of isobutylene, polyolefin polymers, polystyrene polymers and copolymers, and copolymers of butadiene/styrene/acrylonitrile.

3. The method of claim 1 wherein applying comprises spraying said aqueous solution onto the back surface.

4. The method of claim 3 wherein spraying further comprises spraying using an aerosol mechanism or a pressure pump mechanism.

5. The method of claim 1 wherein the aqueous solution comprises from 1 to 90% by weight of poly(vinyl acetate).

6. The method of claim 5 wherein said aqueous solution comprises from 1 to 50% by weight of poly(vinyl acetate).

7. The method of claim 1 wherein the substrate surface comprises at least one of a floor and a countertop.

8. The method of claim 1 wherein the aqueous solution is applied to the elastomeric backing surface by dipping, brushing, painting, or wiping the aqueous solution onto the back surface.

9. A method of reducing slippage between a mat having an elastomeric back surface and a substrate surface comprising:

applying a liquid comprising an aqueous solution of poly(vinyl acetate) directly to the substrate surface; and bringing together the elastomeric back surface and the substrate while the aqueous solution is still wet; and allowing the liquid to dry.

10. The method of claim 9 wherein the elastomeric back surface comprises at least one of natural rubber, synthetic rubber, polyurethane polymers, silicone polymers, polyisoprene, polyacrylates, polyamides, polyolefins, polybutadiene polymers and copolymers, polymers and copolymers of chloroprene rubbers, polymers and copolymers of isobutylene, polyolefin polymers, polystryene polymers and copolymers, and copolymers of butadiene/styrene/acrylonitrile.

11. The method of claim 9 wherein applying comprises spraying said aqueous solution onto the substrate surface.

12. The method of claim 11 wherein spraying further comprises spraying using an aerosol mechanism or a pressure pump mechanism.

13. The method of claim 9 wherein the aqueous solution comprises from 1 to 90% by weight of poly(vinyl acetate).

14. The method of claim 13 wherein said aqueous solution comprises from 1 to 50% by weight of poly(vinyl acetate).

15. The method of claim 9 wherein the substrate surface is a floor or a countertop.

16. The method of claim 9 wherein the aqueous solution is applied to the substrate surface by brushing, painting, or wiping the aqueous solution onto the substrate surface.

* * * * *